(12) United States Patent
Alakarhu (10) Patent No.: US 7,724,301 B2
(45) Date of Patent: May 25, 2010

(54) DETERMINATION OF MECHANICAL SHUTTER EXPOSURE TIME

(75) Inventor: Juha Alakarhu, Tampere (FI)

(73) Assignee: Nokia Corporation, Espoo (FI)

( * ) Notice: Subject to any disclaimer, the term of this patent is extended or adjusted under 35 U.S.C. 154(b) by 618 days.

(21) Appl. No.: 11/605,834

(22) Filed: Nov. 27, 2006

(65) Prior Publication Data

US 2008/0122969 A1    May 29, 2008

(51) Int. Cl.
*G03B 7/00* (2006.01)
*H04N 5/235* (2006.01)

(52) U.S. Cl. .............. 348/362; 348/187; 348/296; 348/229.1

(58) Field of Classification Search .......... 348/362, 348/243, 187, 296
See application file for complete search history.

(56) References Cited

U.S. PATENT DOCUMENTS

| | | | |
|---|---|---|---|
| 6,542,194 B1 | 4/2003 | Juen | 348/367 |
| 2004/0218087 A1* | 11/2004 | Jazbutis et al. | 348/362 |
| 2005/0057680 A1* | 3/2005 | Agan | 348/362 |
| 2005/0162512 A1* | 7/2005 | Seakins | 348/62 |
| 2006/0284993 A1* | 12/2006 | Turley et al. | 348/229.1 |

FOREIGN PATENT DOCUMENTS

| | | |
|---|---|---|
| EP | 1 898 635 | 12/2008 |
| JP | 2006211216 | 8/2006 |

OTHER PUBLICATIONS

Geometric Models of Rolling-Shutter Cameras, Marci Meingast, et al EECS Department, University of California, Mar. 29, 2005.
European Office Action issued in parallel European Patent Application No. 07-858884.5 on Jan. 21, 2010 (4 pages).
Patent Abstracts of Japan; Japanese Publication No. 2000278612, Jun. 10, 2000 including English Abstract (1 page) and machine translation of same (19 pages).

* cited by examiner

*Primary Examiner*—David L Ometz
*Assistant Examiner*—Antoinette T Spinks (57) ABSTRACT

The specification and drawings present a new method, apparatus and software product for determining a mechanical shutter exposure time (e.g., an actual closing time) with a rolling readout of an image (e.g., complimentary metal oxide semiconductor) sensor using a predetermined calibration area of the image sensor in digital cameras or in electronic devices with digital cameras.

33 Claims, 6 Drawing Sheets

DETERMINATION OF MECHANICAL SHUTTER EXPOSURE TIME

TECHNICAL FIELD

The present invention relates generally to electronic devices with digital cameras and more specifically, to digital cameras or electronic device with digital cameras that use a mechanical shutter and an image sensor with a rolling readout.

BACKGROUND ART

An image sensor is a component that converts a visible image to an electric signal in a camera (e.g., a digital camera). The image sensors can be divided into two categories: CMOS (complimentary metal oxide semiconductor) or CCD (charge coupled device) sensors. CMOS sensors are used commonly in mobile phones due to their higher degree of integration, lower price and lower power consumption.

One of the biggest problems in a CMOS sensor is its property called a rolling shutter. If a sensor has the rolling shutter, it is exposed line by line, instead of globally. Since each line is exposed at a slightly different time moment, images of moving targets seem to bend. This bending is called a motion skew.

The motion skew can be avoided by using a mechanical shutter, but, when a mechanical shutter is used, the exposure time cannot be set very accurately. This is because capturing an image with a mechanical shutter requires mechanical movement, which is never perfectly accurate. The exposure time of the same mechanical shutter can vary, e.g., ±0.2 ms. So if the required exposure time is 1 ms, the actual exposure time with the mechanical shutter is between 0.8 ms and 1.2 ms. This 20% variance may be acceptable, but if the required exposure time would be shorter, say 0.2 ms, the mechanical shutter could not be used because the actual exposure time would vary from 0 ms to 0.4 ms.

The problem becomes even worse when some new high dynamic range technologies are used. In these technologies, the exposure time is divided into two parts: long and short. So if the required exposure time is again 1 ms, the sensor would actually be exposed two times with, e.g., 0.8 ms and 0.2 ms exposure times. In this case, the mechanical shutter variance would be equal to the short exposure time, i.e., instead of the requested 0.2 ms short exposure time, the actual short exposure time would be between zero and 0.4 ms. This will obviously make the high dynamic range mode unusable.

In earlier implementations, the exposure time was selected so that the mechanical shutter variation was not too larger a portion of a total exposure time. The exposure time has been made longer by allowing less light to hit the sensor. This has been achieved using a filter in front of the lens or a variable iris, whose aperture becomes smaller if the requested exposure time becomes too short compared to its variance.

The problems in the earlier implementations include but are not limited to:
- mechanical components, such as filter or variable iris, increase the cost and size the of the camera module.
- very short exposure times are not possible: this may cause problems in some photographic situations, such as capturing a very fast movement.

DISCLOSURE OF THE INVENTION

According to a first aspect of the invention, an apparatus, comprises: a mechanical shutter, for providing a predefined exposure of an image, the predefined exposure is defined by a global reset time and a closing time of the mechanical shutter; an image sensor with a rolling shutter capability, responsive to the predefined exposure, for providing an image signal comprising calibration and actual image signals by a rolling readout of the image, wherein the calibration image signal is provided by the rolling readout of a predetermined portion of the image using a predetermined calibration area of the image sensor during a time interval between times corresponding to minimum and maximum tolerance values of the predefined exposure for determining, using a predetermined criterion, the closing time of the mechanical shutter using the calibration image signal for compensation of the actual image signal.

According further to the first aspect of the invention, the apparatus may further comprise: a calibration processing module, for the determining the closing time of the mechanical shutter.

According further to the first aspect of the invention, the closing time may be determined by a point at which, during the rolling readout of the predetermined portion of the image, average row exposure readout values as a function of time for consecutive rows during the predefined exposure become substantially constant after being substantially increased after the time corresponding to the minimum tolerance value of the predefined exposure.

Still further according to the first aspect of the invention, the predetermined calibration area of the image sensor may be in a side of a sensor array of the image sensor where the rolling readout starts and comprising a predetermined number of rows.

According further to the first aspect of the invention, after the time corresponding to the maximum tolerance value of the predefined exposure, the image sensor may be configured to change a speed of the rolling readout of the image.

According still further to the first aspect of the invention, after the time corresponding to the maximum tolerance value of the predefined exposure, the image sensor may be configured to stop the rolling readout for a predetermined timeout and continue the rolling readout after the timeout.

According still further to the first aspect of the invention, during the time interval, the image sensor may be configured to provide a partial rolling reset to the predetermined calibration area of the image sensor and to provide a global reset to a remaining area of the image sensor. Further, the closing time may be determined by a point at which, during the rolling readout of the predetermined portion of the image, average row exposure values as a function of time for consecutive rows during the predefined exposure start substantially decreasing to zero after being substantially constant after the time corresponding to the minimum tolerance value of the predefined exposure.

Yet still further according to the first aspect of the invention, the apparatus may be a part of an electronic device or of an electronic device for wireless communications.

Still yet further according to the first aspect of the invention, the calibration area may comprise superpixels, wherein each superpixel of the superpixels may be constructed as one of the following: a) a supercell has a length of one line of the image sensor and a height of a pixel in an actual image area of the image sensor providing the actual image signal, b) a row of pixels is combined in an analog domain to make one row appear as one superpixel, and c) a row of pixels is combined in a digital domain to make one row appear as one superpixel.

Still further still according to the first aspect of the invention, an integrated circuit may comprise all or selected modules of the apparatus.

According further still to the first aspect of the invention, a further global reset may be applied for the calibration area at the time corresponding to the minimum tolerance value of the predefined exposure.

According yet further still to the first aspect of the invention, the actual image signal may be provided by the rolling readout of a remaining area of the image sensor not used as a predetermined calibration area.

According still yet further to the first aspect of the invention, a diffuser component may be placed on a top of the predetermined calibration area.

According still yet further still to the first aspect of the invention, the image sensor may be a complimentary metal oxide semiconductor sensor.

According to a second aspect of the invention, a method, comprises: providing a predefined exposure of an image using a mechanical shutter, the predefined exposure is defined by a global reset time and a closing time of the mechanical shutter; providing an image signal comprising calibration and actual image signals by a rolling readout of the image in response to the predefined exposure using an image sensor with a rolling shutter capability, wherein the calibration image signal is provided by the rolling readout of a predetermined portion of the image using a predetermined calibration area of the image sensor during a time interval between times corresponding to minimum and maximum tolerance values of the predefined exposure for compensation of the actual image signal; and determining the closing time of the mechanical shutter using the calibration image signal for the compensation.

According further to the second aspect of the invention, the closing time may be determined by a point at which, during the rolling readout of the predetermined portion of the image, average row exposure readout values as a function of time for consecutive rows or row number during the predefined exposure become substantially constant after being substantially increased after the time corresponding to the minimum tolerance value of the predefined exposure.

Further according to the second aspect of the invention, the predetermined calibration area of the image sensor may be in a side of a sensor array of the image sensor where the rolling readout starts and comprising a predetermined number of rows.

Still further according to the second aspect of the invention, after the time corresponding to the maximum tolerance value of the predefined exposure, the image sensor may be configured to change a speed of the rolling readout of the image.

According further to the second aspect of the invention, after the time corresponding to the maximum tolerance value of the predefined exposure, the image sensor may be configured to stop the rolling readout for a predetermined timeout and continue the rolling readout after the timeout.

According still further to the second aspect of the invention, during the time interval, the image sensor may be configured to provide a partial rolling reset only to predetermined portion of the image and use global reset to the other image area. Further, the closing time may be determined by a point at which, during the rolling readout of the predetermined portion of the image, average row exposure values as a function of time for consecutive rows or row number during the predefined exposure start substantially decreasing to zero after being substantially constant after the time corresponding to the minimum tolerance value of the predefined exposure.

According yet further still to the second aspect of the invention, the calibration area may comprise superpixels, wherein each superpixel of the superpixels may be constructed as one of the following: a) a supercell has a length of one line of the image sensor and a height of a pixel in an actual image area of the image sensor providing the actual image signal, b) a row of pixels is combined in an analog domain to make one row appear as one superpixel, and c) a row of pixels is combined in a digital domain to make one row appear as one superpixel.

According to a third aspect of the invention, a computer program product comprises: a computer readable storage structure embodying computer program code thereon for execution by a computer processor with the computer program code, wherein the computer program code comprises instructions for performing the second aspect of the invention as being performed by any component or a combination of components of a camera or of an electronic device comprising the camera.

According to a fourth aspect of the invention, an electronic device, comprises: a mechanical shutter, for providing a predefined exposure of an image, the predefined exposure is defined by a global reset time and a closing time of the mechanical shutter; a image sensor with a rolling shutter capability, responsive to the predefined exposure, for providing an image signal comprising calibration and actual image signals by a rolling readout of the image, wherein the calibration image signal is provided by the rolling readout of a predetermined portion of the image using a predetermined calibration area of the image sensor during a time interval between times corresponding to minimum and maximum tolerance values of the predefined exposure for determining, using a predetermined criterion, the closing time of the mechanical shutter using the calibration image signal for compensation of the actual image signal.

According further to the fourth aspect of the invention, the electronic device may further comprise: a calibration processing module, for the determining the closing time of the mechanical shutter.

Further according to the fourth aspect of the invention, the mechanical shutter and the image sensor may be parts of a digital camera.

According to a fifth aspect of the invention, an apparatus, comprises: image exposing means, for providing a predefined exposure of an image, the predefined exposure is defined by a global reset time and a closing time of the mechanical shutter; sensing means, responsive to the predefined exposure, for providing an image signal comprising calibration and actual image signals by a rolling readout of the image, wherein the calibration image signal is provided by the rolling readout of a predetermined portion of the image using a predetermined calibration area of the image sensor during a time interval between times corresponding to minimum and maximum tolerance values of the predefined exposure for determining, using a predetermined criterion, the closing time of the mechanical shutter using the calibration image signal for compensation of the actual image signal.

According further to the fifth aspect of the invention, the image exposing means may be a mechanical shutter and the sensing means may be an image sensor with a rolling shutter capability.

BRIEF DESCRIPTION OF THE DRAWINGS

For a better understanding of the nature and objects of the present invention, reference is made to the following detailed description taken in conjunction with the following drawings, in which:

FIGS. 1a and 1b are graphs demonstrating determination of a mechanical shutter exposure time (e.g., closing time)

with a rolling readout of a CMOS sensor showing: global reset and row by row readout (rolling readout) of the image sensor and the mechanical shutter close time (FIG. 1a) and average row exposure readout values as a function of time for consecutive rows in a calibration area of the CMOS sensor (FIG. 1b), according to an embodiment of the present invention;

MODES FOR CAMMING OUT THE INVENTION

A new method, apparatus and software product for determining a mechanical shutter exposure time (e.g., an actual closing time) with a rolling readout of an image (e.g., complimentary metal oxide semiconductor, CMOS) sensor using a predetermined calibration area of the image sensor in digital cameras or in electronic devices with digital cameras.

According to embodiments of the present invention, in a digital camera with the image sensor (e.g., the CMOS sensor), a predefined exposure of an image on the image sensor with a rolling shutter capability can be provided using a mechanical shutter, wherein said predefined exposure is defined by a global reset time (at which time the mechanical shutter is open) and a closing time of the mechanical shutter. An image signal comprising calibration and actual image signals can be provided by a rolling readout of said image in response to said predefined exposure using the image sensor, wherein the calibration image signal is provided by the rolling readout of a predetermined portion of the image using a predetermined calibration area of the image sensor during a time interval between times corresponding to minimum and maximum tolerance values of said predefined exposure for compensation of the actual image signal. Then the closing time of the mechanical shutter can be determined using the calibration image signal for providing the compensation of the actual image signal. For example, the closing time can be determined by a point at which, during the rolling readout of the predetermined portion of the image, average row exposure readout values as a function of time for consecutive rows during said predefined exposure becomes substantially constant after being substantially increased after the time corresponding to the minimum tolerance value of the predefined exposure.

Furthermore, said predetermined calibration area of the image sensor can be an upper part (or a top) of the image sensor or generally a side of the image sensor where the readout starts and comprise a predetermined number of rows (its actual position can depend on the camera orientation).

According to a further embodiment, after the time corresponding to the maximum tolerance value of the predefined exposure, the image sensor can be configured to change (e.g., increase) a speed of said rolling readout of said image, as described herein.

According to another embodiment, after the time corresponding to said maximum tolerance value of said predefined exposure, the image sensor can be configured to stop the rolling readout for a predetermined timeout and continue said rolling readout after said timeout, as described herein.

According to still further embodiment, during the time interval between the times corresponding to the minimum and maximum tolerance values, the image sensor can be configured to provide a partial rolling reset, as described herein.

According to yet still further embodiment, the shutter closing time can be determined by a point at which, during said rolling readout of the predetermined portion of the image, the average row exposure values as a function of time for consecutive rows during said predefined exposure start substantially decreasing to zero after being substantially constant after the time corresponding to said minimum tolerance value of said predefined exposure, as described herein.

According to yet another embodiment, the calibration area can comprise superpixels, wherein each of these superpixels has a length of one line of the image sensor and a height of a pixel in an actual image area (of said image sensor) which provides the actual image signal, as described herein. Alternatively, the same functionality can be achieved by binning the lines in the calibration area. Binning corresponds to calculating averages of the lines in analog domain. If binning is not available, the lines in the calibration area can be averaged in digital domain.

The image content in the calibration area should be relatively constant to enable accurate calibration. To make the image content constant in that area, according to still another embodiment, a diffuser can be placed on top of the calibration area.

FIGS. 1a, 1b, 2, 3, 4a and 4b demonstrate different embodiments for operation principle for determination of the mechanical shutter exposure time with the rolling readout of the image sensor in digital cameras or electronic devices with digital cameras. The CMOS sensor is used in these figures as an example and other appropriate image sensors (e.g., NMOS sensor) with rolling shutter and/or rolling readout capability can be used as well.

Figure 1A:
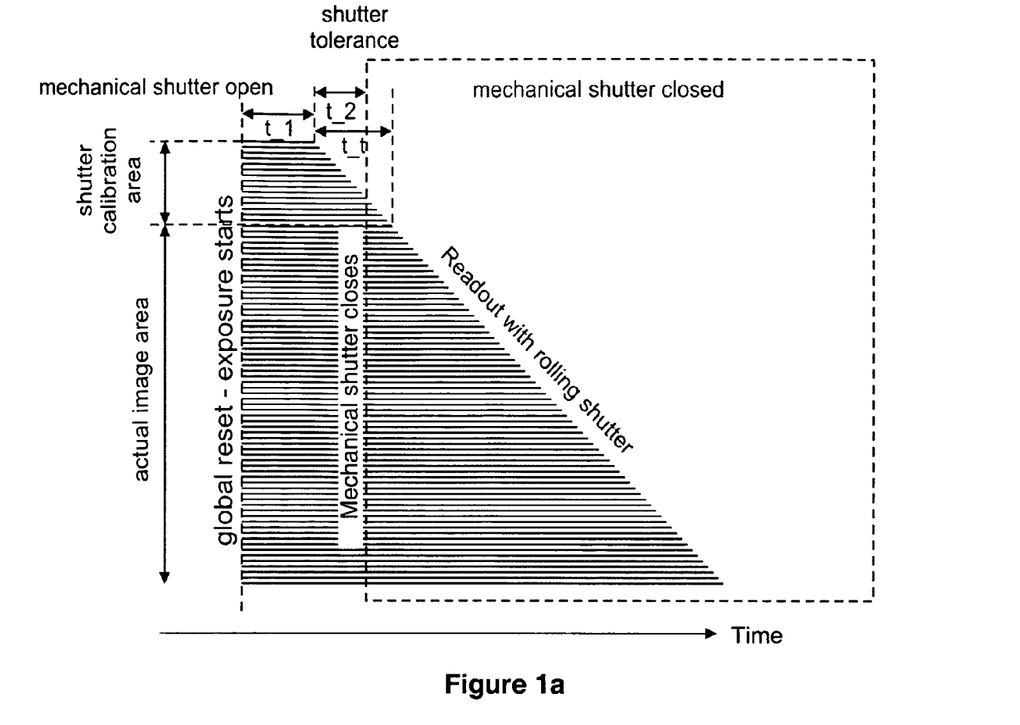
Figure 1B:
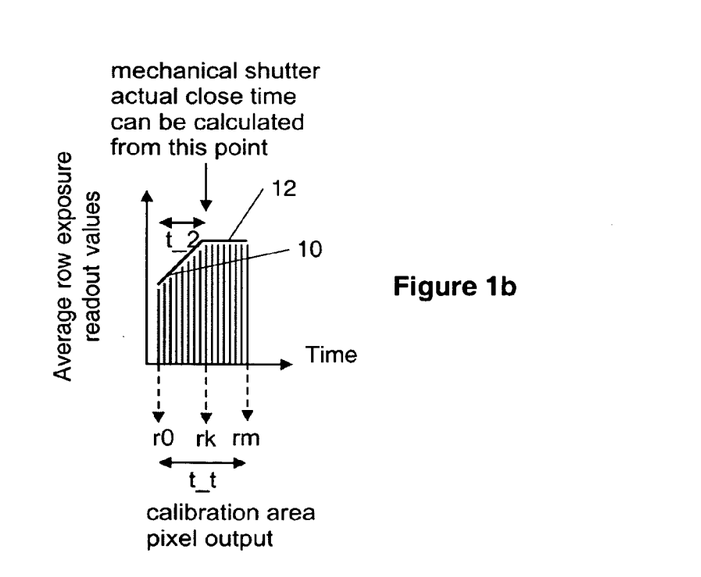

FIGS. 1a and 1b show examples among others of graphs demonstrating determination of the mechanical shutter exposure time (e.g., the closing time) with the rolling readout of a CMOS sensor showing: a row time exposure as a function of position on the CMOS sensor (FIG. 1a) and average row exposure readout values as a function of time for consecutive rows in the calibration area of the CMOS sensor (FIG. 1b), according to an embodiment of the present invention. The horizontal lines in FIG. 1a represent the exposure (i.e., exposure duration) of CMOS sensor rows (it is noted that after closing the mechanical shutter the sensor pixels stay sensitive to the light but the light cannot reach the pixels because the shutter is closed). The exposure can start with a global reset, which is commonly available in image sensors. The upper part of the sensor image area "shutter calibration area" is used as a feedback for determining the actual exposure time of the shutter (see FIG. 1a). The calibration area pixel output data can reveal when the shutter was actually closed using the variation of the average row exposure readout values as a function of time for consecutive rows. Ideally, the readout time of this calibration area is set equal to the shutter tolerance (a time interval between times corresponding to minimum and maximum tolerance values of the exposure time of the mechanical shutter).

When the image is read, the average values of the rows (i.e., the average of all pixels on a given row) in the calibration area behave as shown in FIG. 1b. The rows that are read out when the mechanical shutter is open have values that substantially increase row by row. On the other hand, the rows that are read out when the shutter is closed do not have such a trend (i.e., being substantially constant). This results from global reset and rolling readout.

The accurate shutter closing time is at the knee point of the increasing pixel values at a crossing of lines 10 and 12, as shown in FIG. 1b. Let r0 be the index of the first row in the calibration area, rm be the index of the last row in the calibration area, and let rk be the index of the row in the knee point. In addition, let the rolling readout speed be such that time difference of rm and r0 readout be equal to t_t (shutter tolerance time, i.e., the time interval between times corresponding to minimum and maximum tolerance values), which is known. Given these premises, the actual shutter closing time relative to r0 readout time can be given, e.g., by:

$$t\_2=(rk-r0)/(rm-r0)*t\_t,$$

and the total exposure time can be t_1+t_2.

A simple implementation can be done using existing rolling shutter CMOS sensors which have global reset functionality: the upper part of the sensor image area can be used as the calibration area. In the system implementation, the sensor readout speed is set such that a suitable number of rows are read out during the shutter tolerance time. The rows that are read during the shutter tolerance time automatically become calibration rows. In system implementation, the sensor readout should start at the earliest possible shutter closing time, i.e., nominal shutter closing time minus shutter tolerance time (i.e., at the time corresponding to the minimum tolerance value), as shown in FIG. 1a.

Figure 2:
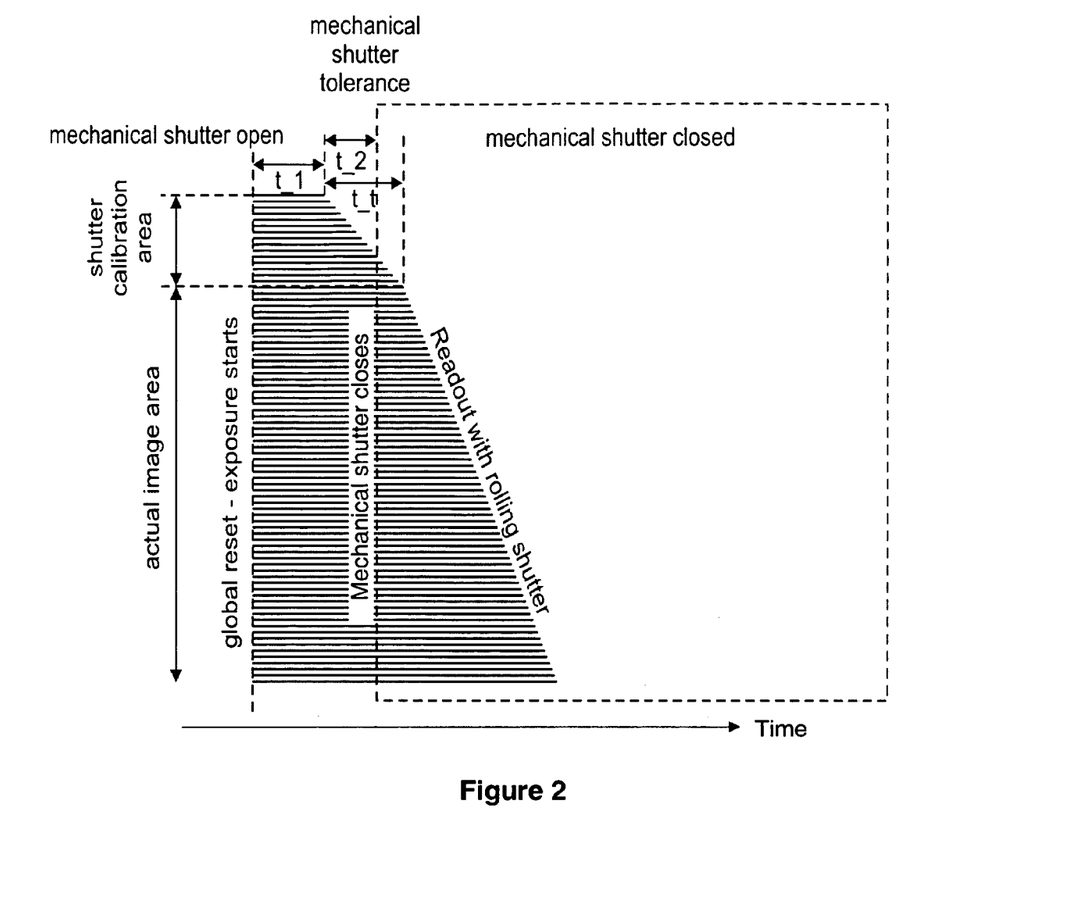
FIG. 2 is a graph demonstrating determination of a mechanical shutter exposure time (e.g., closing time) with a dual rolling readout speed of a CMOS sensor showing a row time exposure as a function of position on the CMOS sensor, according to an embodiment of the present invention.

According to a further embodiment of the present invention, FIG. 2 shows another example among others of a graph demonstrating determination of the mechanical shutter exposure time (e.g., closing time) with the dual rolling readout speed of the CMOS sensor showing the row time exposure as a function of position on the CMOS sensor.

If all sensor rows are read out with the same speed, the readout speed should have a value: t_total=t_t*(rl−r0)/(rm−r0), wherein rl is the index of the last row (other symbols have been explainer earlier). In other words, the total readout time must be such that readout time of the rows in the calibration area becomes t_t. The only way to optimize the total readout time would be optimizing the number of rows in the calibration area. As an alternative, according to a further embodiment, the CMOS sensor can have such functionality that part of its rows could be read out with a different speed than the others. The calibration area could be read out with the different speed (e.g., a slower speed) than the actual image area as shown in FIG. 2. This way, the calibration area readout time, the image area readout time, and the number of rows in the calibration area can be optimized separately. Such functionality is possible to implement in a CMOS sensor.

Figure 3:
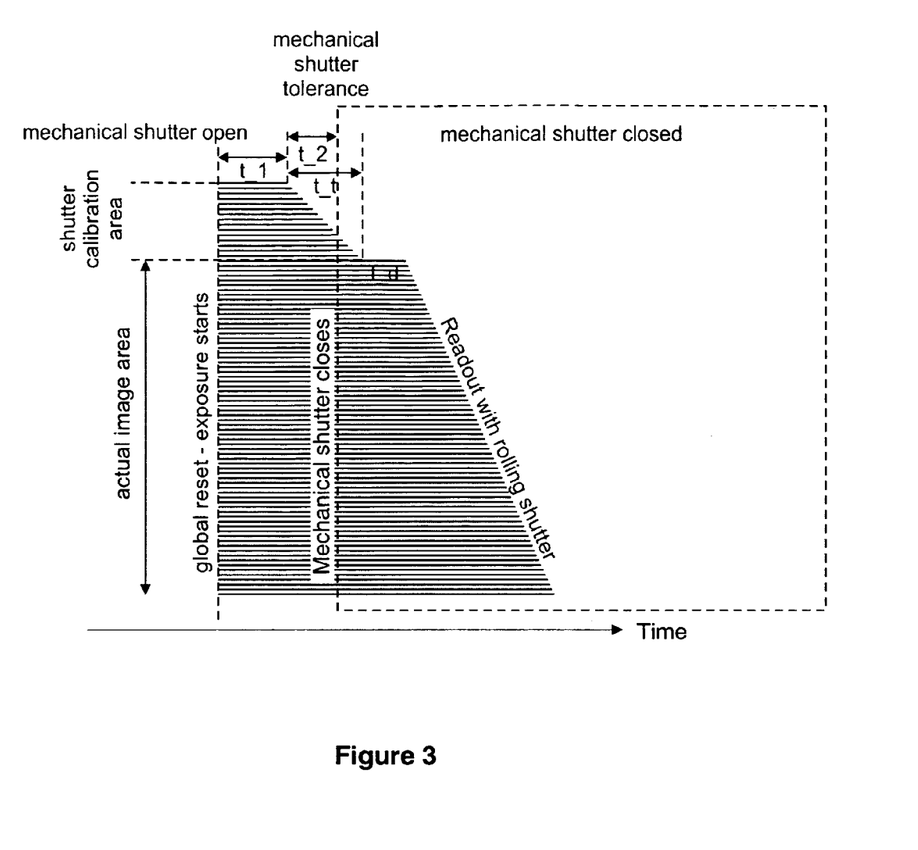
FIG. 3 is a graph demonstrating determination of a mechanical shutter exposure time (e.g., closing time) with a dual rolling readout speed of a CMOS sensor with a delay showing a row time exposure as a function of position on the CMOS sensor, according to an embodiment of the present invention.

FIG. 3 shows yet another example among others of a graph demonstrating determination of a mechanical shutter exposure time (e.g., closing time) with the dual rolling readout speed of the CMOS sensor with a delay showing the row time exposure as the function of position on the CMOS sensor, according to an embodiment of the present invention. In the example of FIG. 3, in a variation of "dual sensor readout speed" approach, a small delay occurs when the sensor readout speed changes. This delay makes sure that the mechanical shutter never closes when the actual image area is read out, even if the mechanical shutter is outside its tolerance area.

Figure 4A:
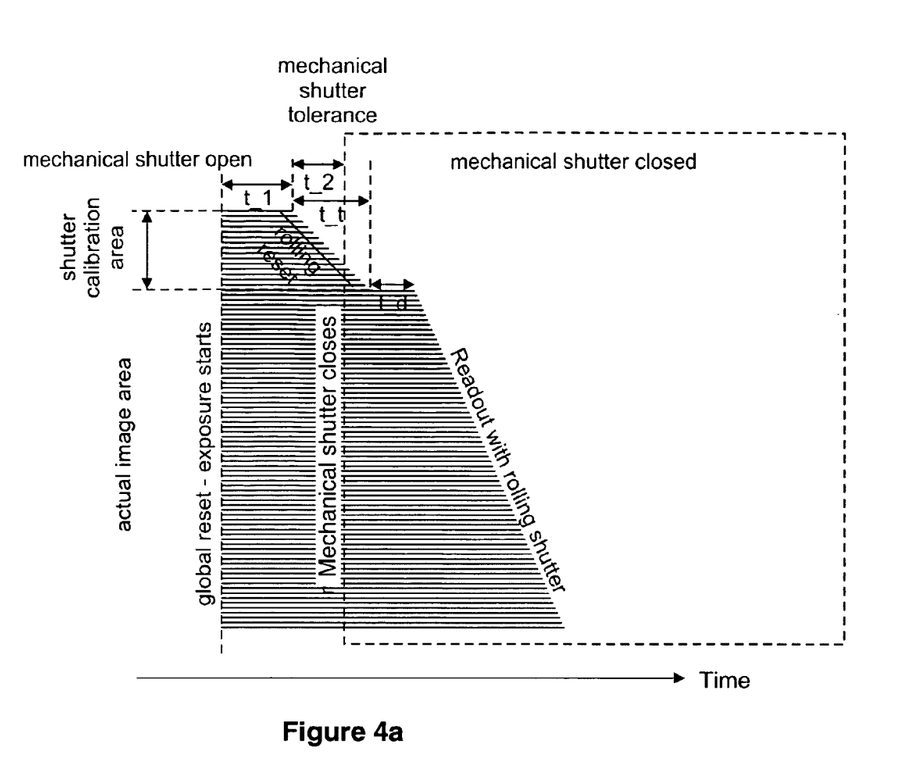
FIGS. 4a and 4b are graphs demonstrating determination of a mechanical shutter exposure time (e.g., closing time) with a dual rolling readout speed and a partial rolling reset of a CMOS sensor with a delay showing: a row time exposure as a function of position on the CMOS sensor (FIG. 4a) average row exposure readout values as a function of time for consecutive rows in a calibration area of the CMOS sensor (FIG. 4b), according to an embodiment of the present invention.
Figure 4B:
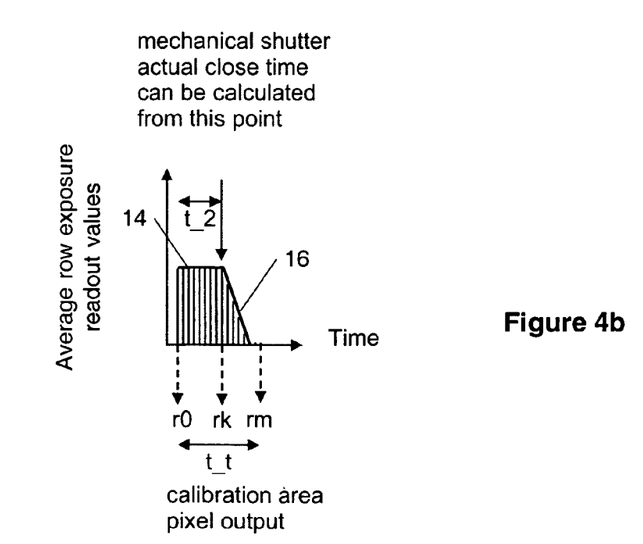

FIGS. 4a and 4b show yet further examples among others of graphs demonstrating determination of a mechanical shutter exposure time (e.g., closing time) with a dual rolling readout speed and a partial rolling reset of a CMOS sensor with a delay showing: a row time exposure as a function of position on the CMOS sensor (FIG. 4a) and average row exposure readout values as a function of time for consecutive rows in the calibration area of the CMOS sensor (FIG. 4b) wherein a global reset is provided to a remaining area of the image sensor (for providing the actual image signal), according to an embodiment of the present invention.

For somewhat longer exposure times, the values in the calibration area may become more difficult to interpret. The reason for this is that if the exposure time is long compared with the t_t or with the calibration area readout time. Thus, the pixel values in the calibration area would have only a small difference. Of course, if the exposure time is longer, an accurate mechanical shutter exposure time feedback becomes less important because the shutter tolerance becomes smaller compared to the whole exposure time. Also, the calibration area readout time can be increased to make the time difference (pixel value difference) more visible. Alternatively, very accurate shutter feedback can be obtained by applying a rolling reset during the readout in the calibration area. This can enable setting the calibration area exposure time so that the pixel output can be easily interpreted regardless of the actual exposure time. When the rolling reset is applied and the rolling exposure time is short enough, the pixel value goes from a substantially constant saturation value (exposure occurs fully when the shutter is open) to zero (exposure occurs fully when the shutter is closed) and the accurate shutter closing time is at a crossing of lines 14 and 16, as shown in FIG. 4b.

It is further noted that implementing partial rolling reset to a CMOS sensor is possible. When an electronic shutter is used, the sensor always uses the rolling reset. In this implementation, the rolling reset would be applied only to the upper part of the image area (calibration area). A variation of this idea would be to apply another global reset for the calibration area at t_1. However, using the global reset in the calibration area would not provide any advantages compared to the rolling reset.

Because only an average of the lines in the calibration area is used, no need for accurate horizontal pixel data may be necessary. Thus, according to another embodiment, the calibration area pixels can be combined to a very large superpixels, whose length is one line of the CMOS sensor and height is a height of a pixel in an actual image area (providing the actual image signal) of said CMOS sensor. The properties of such superpixel are much better than those of just a single small pixel: less noise, higher signal, more sensitive. Utilizing such superpixels makes it easier to detect the accurate shutter closing time due to a better signal-to-noise ratio.

Thus, determination of a mechanical shutter exposure time according to various embodiments of the present invention can enable: a) very short and accurate exposure times with a mechanical shutter; b) dropping ND (neutral density) filter or iris from the camera, which makes it cheaper and smaller, c) using certain high dynamic range technologies with mechanical shutter which are not possible otherwise, etc.

The obvious question that might be raised is that the actual shutter closing is not abrupt as shown in the FIGS. 1a, 2, 3 and 4a. Indeed, practical shutters have a finite closing time during which the image becomes dark. However, the finite closing time is not a problem: the exposure time can still be read from the calibration area pixel output, a similar way as explained in the embodiments described herein. It is just necessary to have long enough calibration time. Moreover, various embodiments such as dual readout speed sensor, dual readout speed sensor with delay, and especially dual readout with partial global reset can facilitate implementation even with very non-ideal shutters.

For implementation of various embodiments of the present invention, there is a need for extra pixels for the calibration area. However, even a very small number of calibration rows (e.g., 10) makes the shutter exposure time much more accurate. Actually, accuracy is directly proportional to the number of calibration rows. So if the native shutter tolerance is ±0.2 ms, the effective tolerance becomes ±0.02 ms in a system with 10 calibration rows.

If the image is captured in darkness, the feedback does not work because there will be no difference in the image area with a closed or open shutter. However, in darkness or even dim conditions, exposure time feedback is not needed, because the exposure time is typically long compared to the shutter tolerance anyway.

Figure 5:
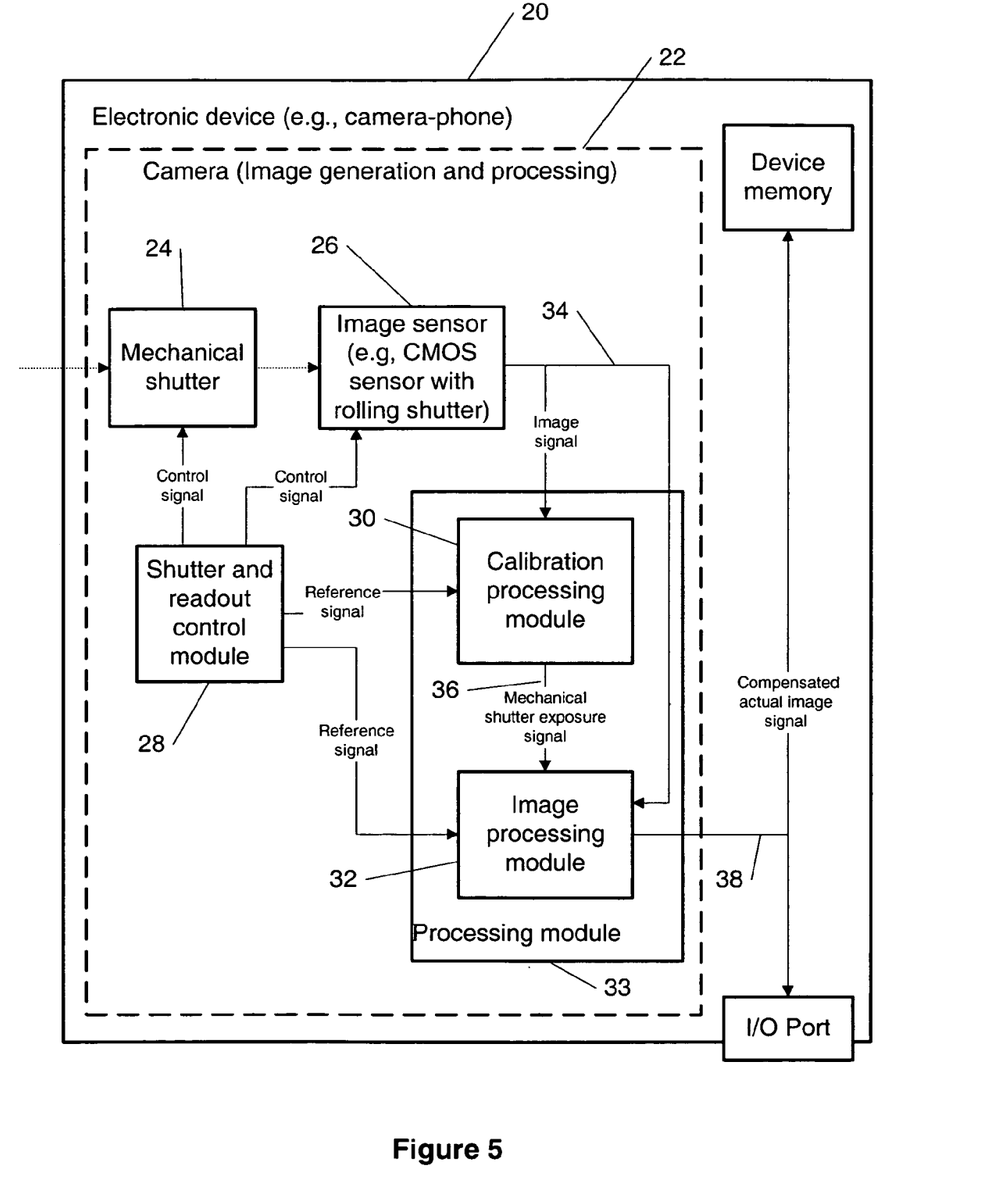
FIG. 5 is a block diagram of an electronic device (e.g., a mobile phone) with a digital camera for implementing determination of a mechanical shutter exposure time (e.g., closing time) with a rolling readout of an image (e.g., CMOS sensor), according to an embodiment of the present invention.

FIG. 5 shows an example among others of a block diagram of an electronic device 20 (e.g., a mobile phone) with a camera (e.g., a digital camera) 22 for implementing determination of a mechanical shutter exposure time (e.g., actual closing time) with a rolling readout of the image sensor (e.g., the CMOS sensor), according to an embodiment of the present invention. The electronic device 20 can be, but is not limited to, a camera, a digital camera, a wireless communication device, a mobile phone, a camera-phone mobile device, a portable electronic device, non-portable electronic device, etc.

The camera 22 can comprise a mechanical shutter 24 and the image sensor 26 (e.g., the CMOS sensor) with the rolling shutter capability for capturing the image to provide an image signal 34 according to various embodiments described herein. A shutter and readout control module 28 can facilitate the performance of the mechanical shutter 24 and the image sensor 26 using control signals, e.g., according to scenarios shown in FIGS. 1a, 2, 3 and 4a.

A processing module 33 can comprise a calibration processing module 30 which can be used for determining, using the predetermined criteria described herein, the closing time of the mechanical shutter using the calibration image signal (as a component) of the image signal 34, according to various embodiments of the present invention. Thus, the module 33 can provide a mechanical shutter exposure signal 36 comprising the closing time of the mechanical shutter calculated (or estimated) according to algorithms shown, e.g., in FIG. 1b or 4b. The actual image signal (as a component) of the image signal 34 is processed and compensated using the signal 36 and provided as a compensated actual image signal 38 for further use, as shown in FIG. 5.

The module 28 can be a dedicated block in the camera 22 (or in the electronic device 20 in general) or it can be incorporated within the module 33 or other modules of the electronic device 20.

According to an embodiment of the present invention, the module 33, 30 or 32 can be implemented as a software or a hardware block or a combination thereof. Furthermore, the module 33, 30 or 32 can be implemented as a separate module or can be combined with any other block or module of the camera 22 or the electronic device 20, or it can be split into several blocks according to their functionality. All or selected modules/blocks in the camera 22 (or in the electronic device 20 in general) can be implemented using one integrated circuit.

Figure 6:
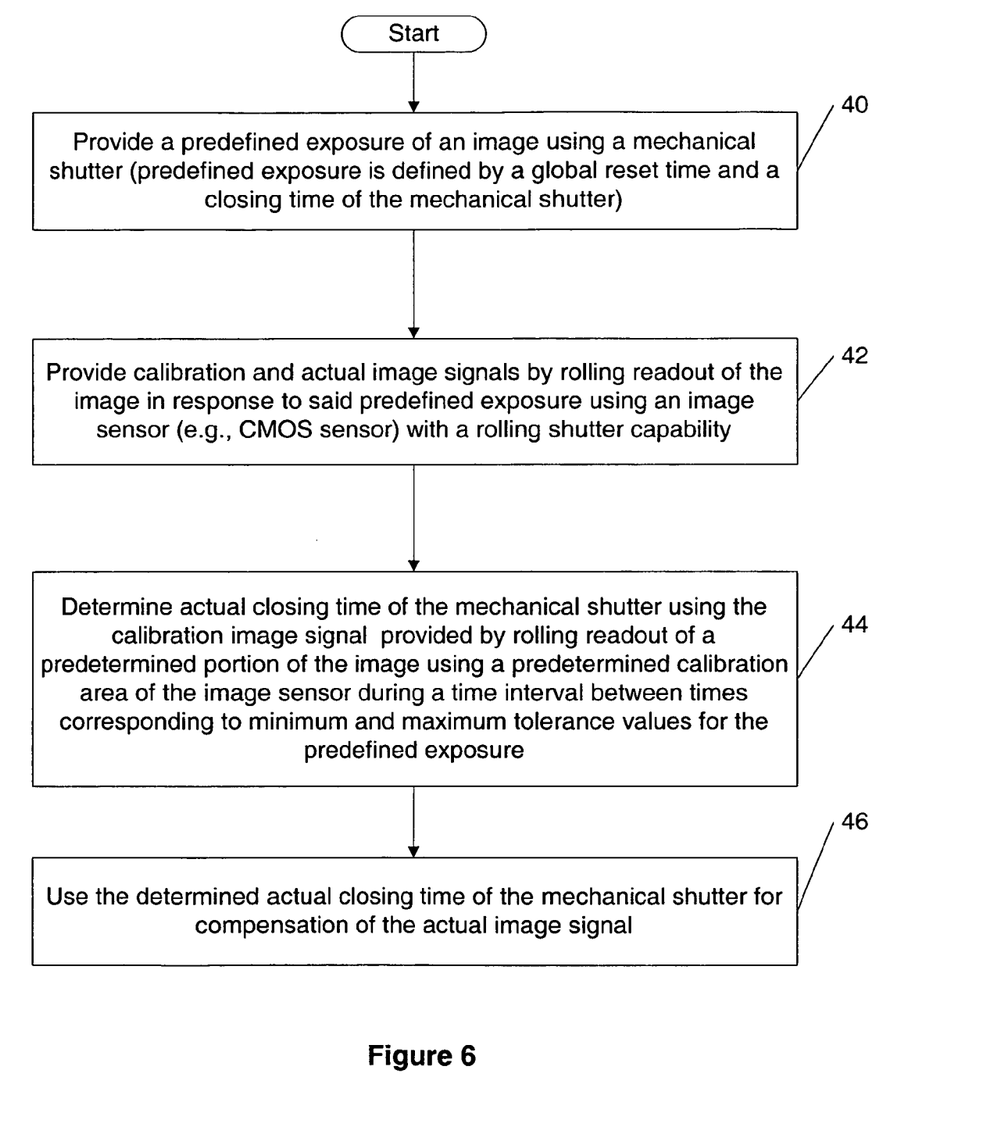
FIG. 6 is a flow chart demonstrating determination of a mechanical shutter exposure time (e.g., closing time) with a rolling readout of an image (e.g., CMOS) sensor, according to an embodiment of the present invention.

FIG. 6 shows a flow chart demonstrating determination of the mechanical shutter exposure time (e.g., closing time) with the rolling readout of the image sensor (e.g., the CMOS sensor), according to an embodiment of the present invention.

The flow chart of FIG. 6 only represents one possible scenario among many others. The order of steps shown in FIG. 6 is not absolutely required, so generally, the various steps can be performed out of order. In a method according to an embodiment of the present invention, in a first step 40, a predefined exposure of an image is provided using a mechanical shutter 24 with a rolling shutter capability (predefined exposure is defined by a global reset time and a closing time of the mechanical shutter), as described herein. In a next step 42, the calibration and actual image signals comprised in the image signal 34 are provided by using rolling readout of the image in response to the predefined exposure using, e.g., the image sensor 26.

In a next step 44, the closing time (i.e., the actual closing time) of the mechanical shutter 24 is determined using the calibration image signal provided by the rolling readout of the predetermined portion of the image using a predetermined calibration area of the image sensor 26 during a time interval between times corresponding to minimum and maximum tolerance values of the predefined exposure of the mechanical shutter. In a next step 46, the calculated closing time of the mechanical shutter 24 is used for compensation of the actual image signal and providing the compensated actual image signal 38.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

Also, it is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus, comprising:
    a mechanical shutter, configured to provide a predefined exposure of an image, said predefined exposure is defined by a global reset time and a closing time of the mechanical shutter; and
    an image sensor with a rolling shutter capability, responsive to said predefined exposure, configured to provide an image signal comprising a calibration image signal and an actual image signal by a rolling readout of said image, wherein the calibration image signal is provided by the rolling readout of a predetermined portion of the image using a predetermined calibration area of the image sensor during a time interval between times corresponding to minimum and maximum tolerance values of said predefined exposure for determining, using a predetermined criterion, said closing time of the mechanical shutter using said calibration image signal for compensating of the actual image signal, wherein said predetermined calibration area does not overlap with an area of the image sensor used for providing said actual image.

2. The apparatus of claim 1, further comprising:
a calibration processing module, configured to determine said closing time of the mechanical shutter using said predetermined criterion.

3. The apparatus of claim 1, wherein said calibration processing module is configured to determine said closing time at a point at which, during said rolling readout of said predetermined portion of the image, average row exposure readout values as a function of time for consecutive rows during said predefined exposure become substantially constant after being substantially increased after said time corresponding to said minimum tolerance value of said predefined exposure.

4. The apparatus of claim 1, wherein said predetermined calibration area of the image sensor is in a side of a sensor array of said image sensor where the rolling readout starts and comprising a predetermined number of rows.

5. The apparatus of claim 1, wherein, after said time corresponding to said maximum tolerance value of said predefined exposure, the image sensor is configured to change a speed of said rolling readout of said image.

6. The apparatus of claim 1, wherein, after said time corresponding to said maximum tolerance value of said predefined exposure, the image sensor is configured to stop said rolling readout for a predetermined timeout and continue said rolling readout after said timeout.

7. The apparatus of claim 1, wherein, during said time interval, the image sensor is configured to provide a partial rolling reset to said predetermined calibration area of the image sensor and to provide a global reset to a remaining area of the image sensor.

8. The apparatus of claim 7, wherein said closing time is determined by a point at which, during said rolling readout of said predetermined portion of the image, average row exposure values as a function of time for consecutive rows during said predefined exposure start substantially decreasing to zero after being substantially constant after said time corresponding to said minimum tolerance value of said predefined exposure.

9. The apparatus of claim 1, wherein said apparatus is a part of an electronic device or of an electronic device for wireless communications.

10. The apparatus of claim 1, wherein said calibration area comprises superpixels, wherein each superpixel of said superpixels is constructed as one of the following:
a supercell has a length of one line of said image sensor and a height of a pixel in an actual image area of said image sensor providing said actual image signal,
a row of pixels is combined in an analog domain to make one row appear as one superpixel, and
a row of pixels is combined in a digital domain to make one row appear as one superpixel.

11. The apparatus of claim 1, wherein an integrated circuit comprises all or selected modules of said apparatus.

12. The apparatus of claim 1, wherein a further global reset is applied for the calibration area at the time corresponding to said minimum tolerance value of said predefined exposure.

13. The apparatus of claim 1, wherein said actual image signal is provided by the rolling readout of a remaining area of the image sensor not used as a predetermined calibration area.

14. The apparatus of claim 1, wherein a diffuser component is placed on a top of the predetermined calibration area.

15. The apparatus of claim 1, wherein said image sensor is a complimentary metal oxide semiconductor sensor.

16. A method, comprising:
providing a predefined exposure of an image using a mechanical shutter, said predefined exposure is defined by a global reset time and a closing time of the mechanical shutter;
providing an image signal comprising a calibration image signal and an actual image signal by a rolling readout of said image in response to said predefined exposure using an image sensor with a rolling shutter capability, wherein the calibration image signal is provided by the rolling readout of a predetermined portion of the image using a predetermined calibration area of the image sensor during a time interval between times corresponding to minimum and maximum tolerance values of said predefined exposure for compensating of said actual image signal, wherein said predetermined calibration area does not overlap with an area of the image sensor used for providing said actual image; and
determining said closing time of the mechanical shutter using said calibration image signal for said compensating.

17. The method of claim 16, wherein said closing time is determined by a point at which, during said rolling readout of said predetermined portion of the image, average row exposure readout values as a function of time for consecutive rows or row number during said predefined exposure become substantially constant after being substantially increased after said time corresponding to said minimum tolerance value of said predefined exposure.

18. The method of claim 16, wherein said predetermined calibration area of the image sensor is in a side of a sensor array of said image sensor where the rolling readout starts and comprising a predetermined number of rows.

19. The method of claim 16, wherein, after said time corresponding to said maximum tolerance value of said predefined exposure, the image sensor is configured to change a speed of said rolling readout of said image.

20. The method of claim 16, wherein, after said time corresponding to said maximum tolerance value of said predefined exposure, the image sensor is configured to stop said rolling readout for a predetermined timeout and continue said rolling readout after said timeout.

21. The method of claim 16, wherein, during said time interval, the image sensor is configured to provide a partial rolling reset only to predetermined portion of the image and use global reset to the other image area.

22. The method of claim 21, wherein said closing time is determined by a point at which, during said rolling readout of said predetermined portion of the image, average row exposure values as a function of time for consecutive rows or row number during said predefined exposure start substantially decreasing to zero after being substantially constant after said time corresponding to said minimum tolerance value of said predefined exposure.

23. The method of claim 16, wherein said calibration area comprises superpixels, wherein each superpixel of said superpixels is contructed as one of the following:

a supercell has a length of one line of said image sensor and a height of a pixel in an actual image area of said image sensor providing said actual image signal, a row of pixels is combined in an analog domain to make one row appear as one superpixel, and a row of pixels is combined in a digital domain to make one row appear as one superpixel.

24. A computer program product comprising: a computer readable storage structure embodying computer program code thereon for execution by a computer processor with said computer program code, wherein said computer program code comprises instructions for performing the method of claim 16.

25. An electronic device, comprising:

a mechanical shutter, configured to provide a predefined exposure of an image, said predefined exposure is defined by a global reset time and a closing time of the mechanical shutter; and an image sensor with a rolling shutter capability, responsive to said predefined exposure, configured to provide an image signal comprising calibration and actual image signals by a rolling readout of said image, wherein the calibration image signal is provided by the rolling readout of a predetermined portion of the image using a predetermined calibration area of the image sensor during a time interval between times corresponding to minimum and maximum tolerance values of said predefined exposure for determining, using a predetermined criterion, said closing time of the mechanical shutter using said calibration image signal for compensating of the actual image signal, wherein said predetermined calibration area does not overlap with an area of the image sensor used for providing said actual image.

26. The electronic device of claim 25, further comprising:

a calibration processing module, configured to determine said closing time of the mechanical shutter using said predetermined criterion.

27. The electronic device of claim 25, wherein said mechanical shutter and said image sensor are parts of a digital camera.

28. An apparatus, comprising:

means for exposing image, for providing a predefined exposure of an image, said predefined exposure is defined by a global reset time and a closing time of the means for exposing image;

means for sensing, responsive to said predefined exposure, for providing an image signal comprising a calibration image signal and an actual image signal by a rolling readout of said image, wherein the calibration image signal is provided by the rolling readout of a predetermined portion of the image using a predetermined calibration area of the means for sensing during a time interval between times corresponding to minimum and maximum tolerance values of said predefined exposure for determining, using a predetermined criterion, said closing time of the means for exposing image using said calibration image signal for compensating of the actual image signal, wherein said predetermined calibration area does not overlap with an area of the image sensor used for providing said actual image.

29. The apparatus of claim 28, wherein said means for exposing image is a mechanical shutter and said means for sensing is an image sensor with a rolling shutter capability.

30. A processing module, comprising:

a calibration processing module, configured to provide, in response to an image signal, a mechanical shutter exposure signal indicative of the predefined exposure of an image by determining a closing time of a mechanical shutter, said predefined exposure being defined by a global reset time and said closing time of the mechanical shutter, wherein said mechanical shutter is configured to provide said predefined exposure, and wherein said image signal comprises a calibration image signal and an actual image signal and is generated by an image sensor with a rolling shutter capability using a rolling readout of said image and in response to said predefined exposure and wherein the calibration image signal is provided using the rolling readout of a predetermined portion of the image using a predetermined calibration area of the image sensor during a time interval between times corresponding to minimum and maximum tolerance values of said predefined exposure, wherein said predetermined calibration area does not overlap with an area of the image sensor used for providing said actual image.

31. The processing module of claim 30, further comprising an image processing module, responsive to said mechanical shutter exposure signal and configured to provide a compensated actual image signal.

32. The processing module of claim 31, wherein said calibration processing module and said image processing module are combined.

33. The processing module of claim 30, wherein an integrated circuit comprises all or selected modules of said processing module.

* * * * *